(12) United States Patent
Auray et al.

(10) Patent No.: US 7,841,630 B1
(45) Date of Patent: Nov. 30, 2010

(54) ELECTRIC METAL TUBE PUSH-IN FITTING

(75) Inventors: Delbert Auray, Southport, CT (US); Lawrence J. Smith, Stamford, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 272 days.

(21) Appl. No.: 11/901,797

(22) Filed: Sep. 19, 2007

(51) Int. Cl.
*F16L 19/08* (2006.01)

(52) U.S. Cl. ............... 285/340; 285/386; 285/151.1; 285/154.1

(58) Field of Classification Search .......... 285/340, 285/149.1, 151.1, 154.1, 386; 174/650–655, 174/659, 660
See application file for complete search history.

(56) References Cited

U.S. PATENT DOCUMENTS

| | | | | |
|---|---|---|---|---|
| 1,809,582 A | * | 6/1931 | Church | 285/340 |
| 1,822,056 A | * | 9/1931 | Noble | 285/340 |
| 2,255,673 A | * | 9/1941 | McDermett | 285/382.7 |
| 2,448,888 A | * | 9/1948 | Hynes | 285/232 |
| 3,312,484 A | * | 4/1967 | Davenport | 285/340 |
| 3,679,241 A | * | 7/1972 | Hoffmann | 285/340 |
| 3,995,897 A | * | 12/1976 | Paskert | 285/340 |
| 4,072,328 A | * | 2/1978 | Elliott | 285/340 |
| 4,073,514 A | * | 2/1978 | Pate | 285/149.1 |
| 4,123,090 A | | 10/1978 | Kotsakis et al. | |
| 4,181,329 A | * | 1/1980 | Helm | 285/3 |
| 4,490,576 A | * | 12/1984 | Bolante et al. | 174/655 |
| 4,635,975 A | * | 1/1987 | Campbell | 285/340 |
| 4,819,974 A | * | 4/1989 | Zeidler | 285/373 |
| 4,885,429 A | * | 12/1989 | Schnittker | 174/668 |
| 5,059,747 A | * | 10/1991 | Bawa et al. | 174/655 |
| 5,284,582 A | | 2/1994 | Yang | |
| 5,695,224 A | | 12/1997 | Grenier | |
| 6,334,634 B1 | | 1/2002 | Osterkil | |
| 6,335,488 B1 | | 1/2002 | Gretz | |
| 6,352,439 B1 | | 3/2002 | Stark et al. | |
| 6,450,550 B1 | | 9/2002 | Cornwell | |
| 6,464,266 B1 | | 10/2002 | O'Neill et al. | |
| 6,517,124 B1 | | 2/2003 | La Quere | |
| 6,663,145 B1 | | 12/2003 | Lyall, III et al. | |
| 6,670,553 B1 | * | 12/2003 | Gretz | 174/664 |
| 6,682,355 B1 | | 1/2004 | Gretz | |
| 6,765,143 B2 | | 7/2004 | Kiely | |
| 6,913,292 B2 | | 7/2005 | Snyder, Sr. et al. | |
| 6,988,746 B2 | * | 1/2006 | Olson | 285/151.1 |
| 7,390,027 B2 | * | 6/2008 | Kiely | 285/151.1 |
| 2005/0194785 A1 | * | 9/2005 | Shemtov | 285/382.7 |

* cited by examiner

*Primary Examiner*—Aaron Dunwoody
*Assistant Examiner*—Robert Williams
(74) *Attorney, Agent, or Firm*—Fattibene and Fattibene; Paul A. Fattibene

(57) ABSTRACT

An electrical fitting in the form of a connector or coupler for connecting an electric metal tube to an electrical box or panel or to one another. The fitting includes a body having an inlet end portion, an outlet end portion and a bore extending therethrough. An unidirectional locking device is disposed in an outermost chamber and a sealing washer disposed in an intermediate chamber. A split ring having an angularly bent leading end is provided with a series of offset circumferentially spaced unidirectional gripping tangs. The locking device may also be provided with a series of tube support tangs at the trailing end. Also, the locking device includes a tang forming an electrical bonding or ground between tubes, locking device and connector body.

8 Claims, 6 Drawing Sheets

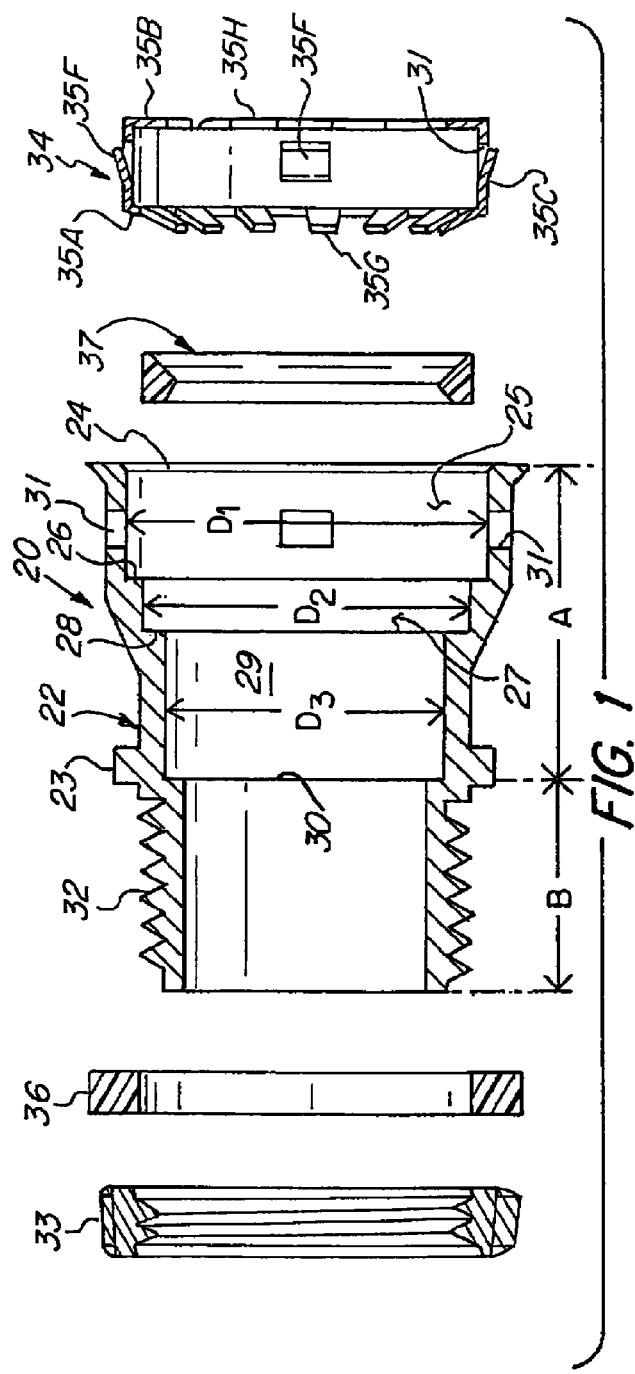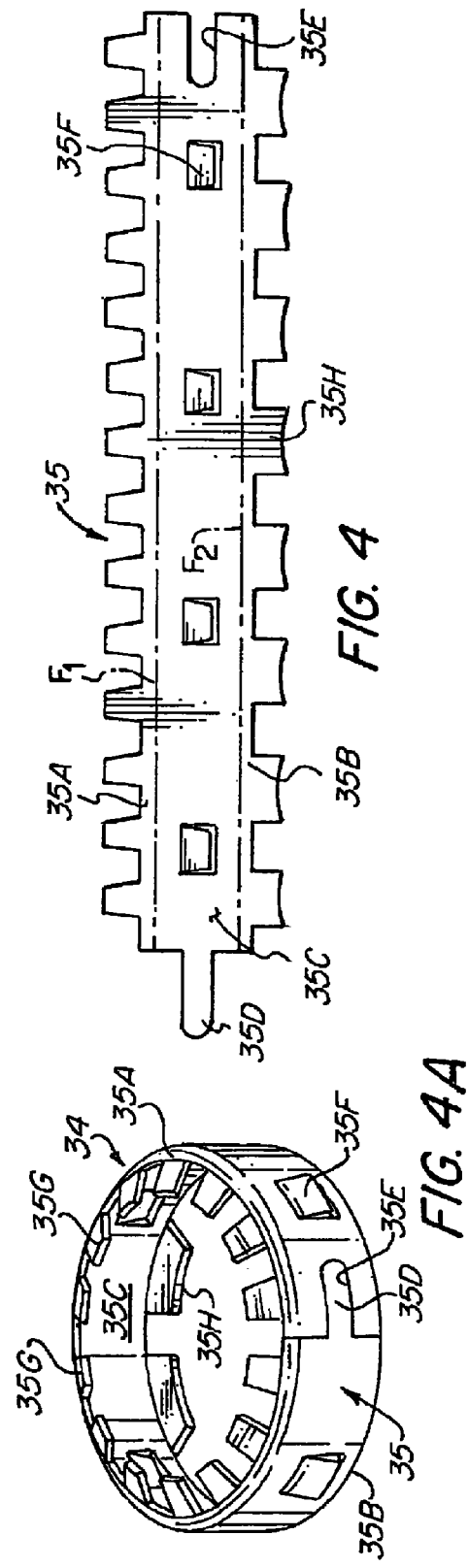

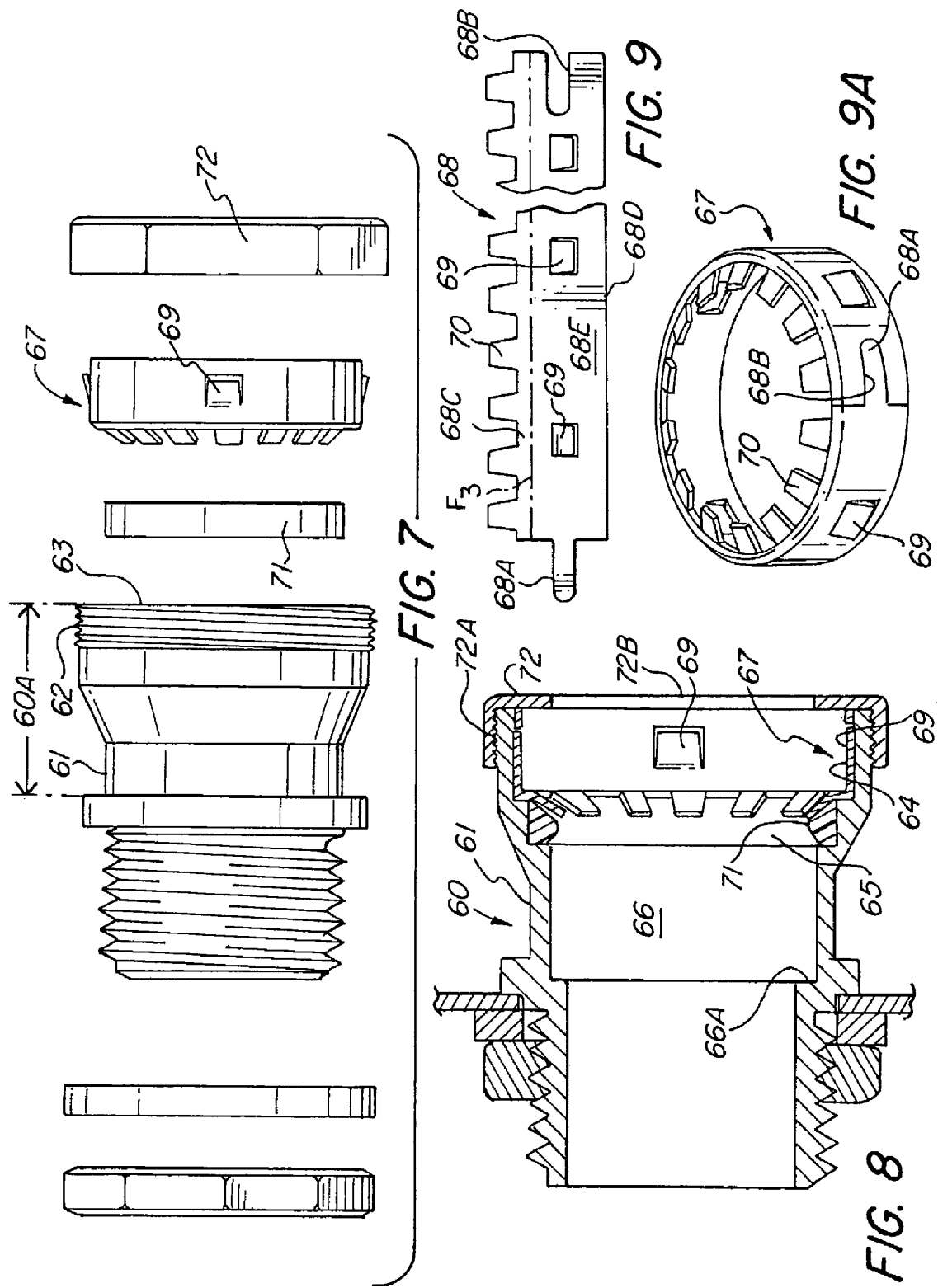

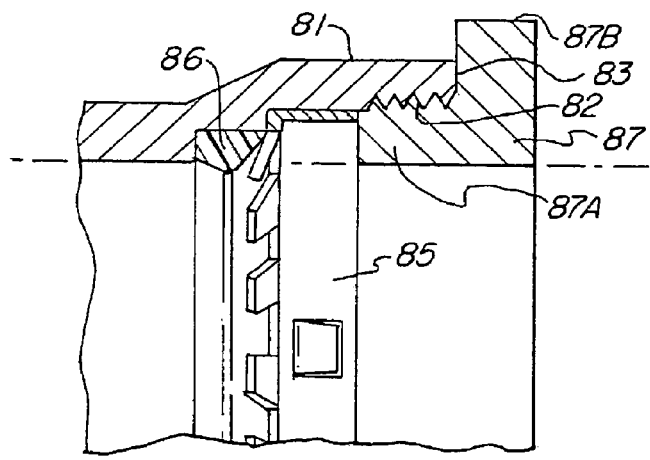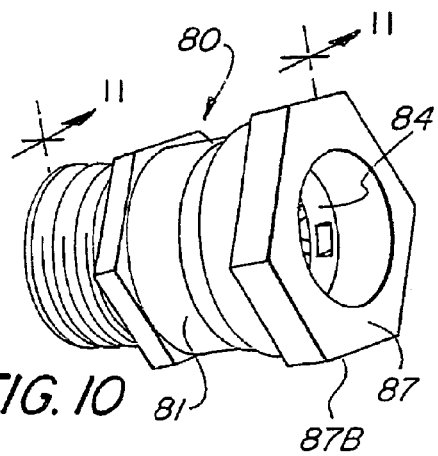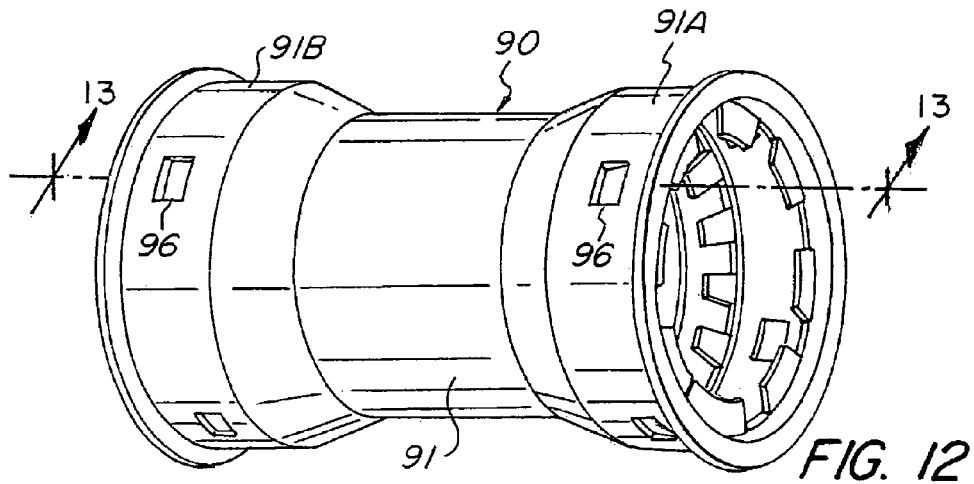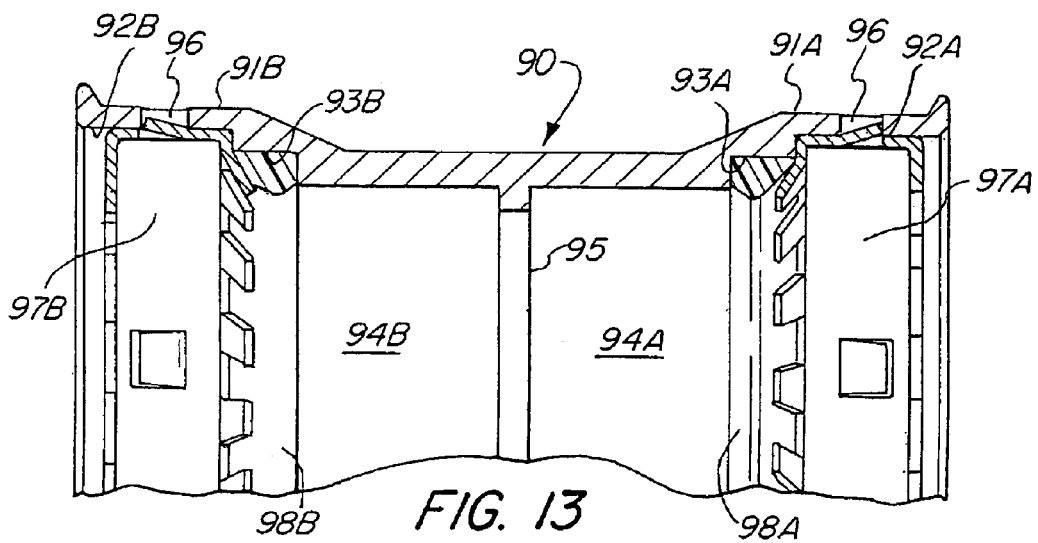

ELECTRIC METAL TUBE PUSH-IN FITTING

FIELD OF THE INVENTION

This invention relates generally to electrical connectors or fittings for use with electrical metal tubes (EMT), and more specifically to a "push-in" connector for attaching an electric metal tube to an electric box or panel or for connecting one electric metal tube to another electric metal tube.

BACKGROUND OF THE INVENTION

Various types of connectors or fittings for connecting tubes or conduits to a structure or to one another are known, as exemplified in U.S. Pat. Nos. 4,123,090; 5,284,582; 5,695,224; 6,334,634; 6,450,550; 6,464,266; 6,517,124; 6,663,145; 6,670,553; 6,765,143 and 6,913,292. Generally, the known connectors or fittings are relatively complex. Many consist of a relatively large number of component parts that require assembly which may not be cost effective and/or practical for their intended purpose. Further, some of the known connectors or fittings are not suitable for use with electrical metal conduits or tubes. Notwithstanding the extensive background relating to connectors or fittings for connecting tubular conduits, continuing efforts are being made to improve, simplify and/or to enhance the efficiency and/or use of such connectors or to simplify the assembly, cost and/or complexity of such known connectors or fittings in an effort to advance the connector art, and more specifically to advance the electrical tube connector art. The disclosure herein is directed to such efforts.

SUMMARY OF THE INVENTION

An object of this invention is to provide an electrical connector or fitting for connecting an electric metal tube or conduit thereto merely by pushing an end portion of an electric metal tube through the inlet opening of the electrical connector or fitting.

Another object is to provide an electrical connector or fitting incorporating a simple push-in locking arrangement for an electrical metal tube adapted to connect such tube to an electric box or in the form of a coupler for joining two or more EMTs together.

Another object is to provide an electric connector or fitting having a unidirectional locking arrangement for securing an electric metal tube thereto whereby in one form of the invention, the electric metal tube can be rendered readily removable and in another form of the invention, removal of the electric metal tube is prohibited.

Another object of the invention is to provide an electrical connector or fitting having a simplified locking and sealing arrangement to which an electric metal conduit may be positively secured thereto simply by pushing the end portion of an electric metal tube through the inlet opening of the connector or fitting.

Another object of this invention is to provide a locking device constructed and arranged to effect a positive unidirectional gripping force on an associated electric metal tube with an arrangement for retaining the locking device within the body of a connector to prohibit any unintentional separation thereof from the connector body.

Another object of the invention is to provide an electric connector or fitting having a locking device for securing an electric metal tube thereto by simply pushing an end portion of an electric metal tube through the locking device and which may be used with or without a water, liquid or moisture seal.

Another feature of the invention resides in an electrical connector or fitting for securing an electric metal tube or conduit thereto which is relatively simple to manufacture, easy to assemble and positive in operation.

A feature of this invention resides in a locking or gripping device formed from a blank of spring metal rolled into the form of a split ring having integrally formed circumferentially spaced depending gripping tangs and opposed integrally formed radially inward support tangs for supporting an electric metal tube adapted to be secured thereto.

The foregoing objects, features and advantages are attained by an electrical connector or fitting having a locking arrangement for enhancing the ease of connecting an electric metal tube to an electric box or panel or to connect one electric metal tube to another electric tube. The connector or fitting includes essentially a connector body having an inlet end portion and an outlet end portion with a bore extending therebetween. In one form of the invention, the inlet end portion defines an enlarged inlet forming an outermost chamber having a predetermined diameter for receiving a specifically constructed locking device, an intermediate chamber having a smaller diameter into which the locking tangs of the locking device may extend, and an innermost chamber having a lesser diameter sized for snugly receiving an end portion of a corresponding electric metal tube or conduit adapted to be fitted into the inlet end portion of the connector. The outermost chamber and intermediate chamber at their inner end are defined by shoulders and the inner end of the inner chamber being defined by an inwardly extending shoulder which functions as a stop to limit the distance the electric metal tube can be inserted thereinto.

The locking device is formed of a spring steel elongated blank which is rolled to define a split ring having a leading edge and a trailing edge that are inwardly bent relative to an intermediate planar portion therebetween. The readily inwardly bent leading edge of the locking device is provided with a series of circumscribing locking or gripping tangs that are inwardly and obliquely bent at approximately a 30° angle which are inclined or obliquely angled toward the intermediate chamber. The depending trailing edge of the locking device includes a series of support tangs arranged to define the inner periphery of the inlet opening of the connector body.

In one form of the invention, the intermediate planar portion of the locking device is provided with one or more holding tangs blanked or cut out of the plane of the intermediate planar portion that are outwardly bent and arranged to be received in a corresponding tang opening formed in the connector body adjacent the inlet opening in a manner to prohibit any pull-out of the locking device from the connector body.

A resilient circular sealing ring or washer may be optionally seated within the intermediate chamber immediately forward of the leading edge of the locking ring. The arrangement is such that to effect the connection of an electric metal tube to the connector body, one need only push one end of the electric metal tube through the inlet opening and through the locking or gripping tangs of the locking device.

In another form of the invention, the locking device may be secured within the connector body by a lock nut threaded about the periphery of the inlet opening.

The connector or fitting embodying the invention may also be in the form of a coupler for connecting two or more electrical metal tubes together.

The various embodiments of the respective locking devices include resilient holding tangs which also function as an electric bond or ground.

IN THE DRAWINGS

FIG. 1 is an exploded view of an electric metal tube connector or fitting in which the component parts are shown in section.

FIG. 4 is a top plan view of the blank from which the locking device is formed.

FIG. 4A is a perspective view of the locking ring formed from the blank shown in FIG. 4.

FIG. 7 is an exploded view of another modified form of the invention.

FIG. 8 is a sectional view of the embodiment of FIG. 7 showing the component parts in an assembled position.

FIG. 9 is a plan view of a modified blank from which the locking device is formed.

FIG. 9A is a perspective view of the blank of FIG. 9 rolled to define a modified form of a locking device.

FIG. 10 is a perspective view of still another form of the invention.

FIG. 11 is a fragmentary sectional side view taken along line 11-11 of the embodiment of FIG. 10.

FIG. 12 is a perspective view of still another form of the invention.

FIG. 13 is a sectional side view taken along line 13-13 in the embodiment of FIG. 12.

DETAILED DESCRIPTION OF THE PREFERRED EMBODIMENTS

Figure 2:
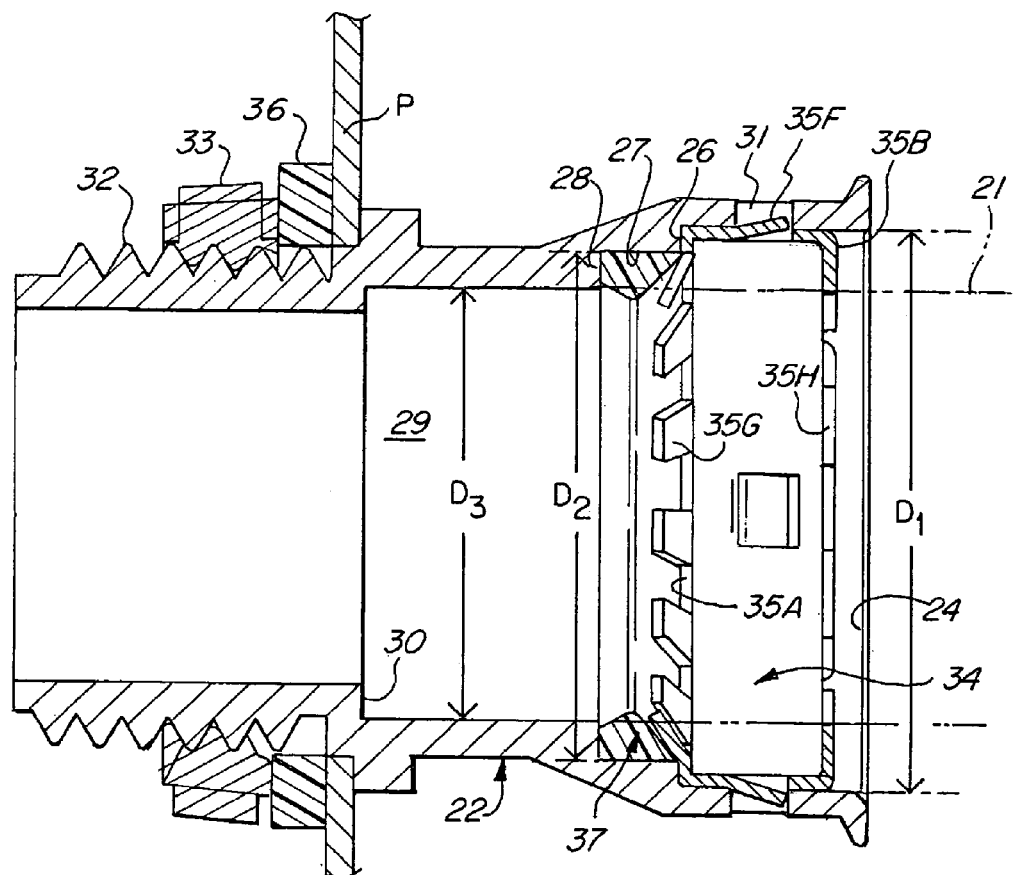
FIG. 2 is a section view of the connector or fitting of FIG. 1 shown in the assembled position thereof.

Referring to the drawings, FIGS. 1 to 4 illustrate an electrical connector or fitting 20 for attaching a conduit or an electric metal tube (EMT) 21 to an electric box or panel (not shown). Tube or conduit as interchangeably used herein are to be accorded their usual dictionary definition unless otherwise specified. The connector or fitting 20 includes a connector body 22 having an inlet portion A and an outlet portion B. Circumscribing the connector body exteriorly thereof is a radially outwardly extending flange 23, which functions as a stop to limit the distance the connector 20 may be inserted through a knockout hole of an electric box or panel, P.

As best shown in FIG. 1, the inlet portion A of the connector body 22 is formed so as to define an enlarged inlet opening circumscribing and defining an outer chamber 25 having a diameter $D_1$, terminating at the inner end thereof by a shoulder 26. Concentrically disposed adjacent the outer chamber 25 is an intermediate chamber 27 having a smaller diameter $D_2$, the inner end being defined by shoulder 28. Adjacent the intermediate chamber 27 and concentric therewith is a smaller tube chamber 29 having a diameter $D_3$ sized to snugly receive an end portion of an electric metal tube or conduit 21, adapted to be fitted or connected to the connector body 22. The inner end of the tube chamber 29 is defined by a shoulder 30 which forms a stop to limit the distance a tube or conduit 21 may be inserted therein.

In accordance with this invention, the portion of the connector body 22 defining the outermost chamber 25 is provided with one or more tang openings or apertures 31 circumferentially spaced therearound. The outlet portion B of the connector body is provided with external threading 32, which is adapted to be inserted through a knockout hole of an electric box or panel P to which the connector 20 may be secured by a locknut 33 or other suitable means, e.g. a snap fit retainer ring of a type disclosed in U.S. Pat. No. 6,935,891, which is incorporated herein by reference.

Figure 3:
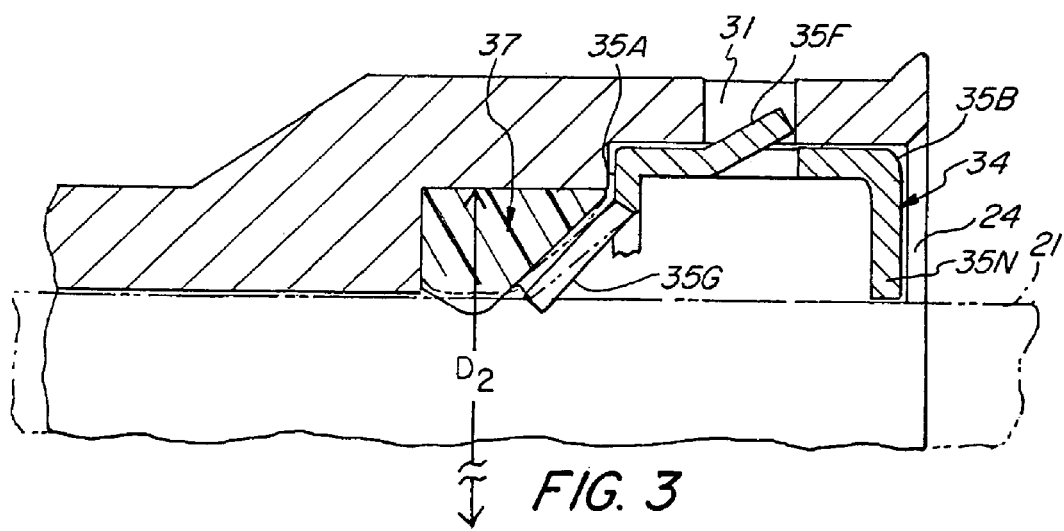
FIG. 3 is an enlarged fragmentary portion of the assembly of the connector or fitting of FIGS. 1 and 2, shown in section.

According to this invention, a unidirectional locking device 34 is provided so as to enable one to attach an electric metal tube 21 thereto simply by pushing an end portion of tube 21 into the inlet portion of the connector body. This is attained by forming the locking device 34 from a blank of spring steel 35. As best seen in FIG. 3, the locking device 34 is preferably formed of an elongated strip or blank of spring steel 35 or the like which is stamped and die cut or formed as illustrated in FIG. 4, which is subsequently rolled or formed in a configuration as best seen in FIG. 4A. Referring to FIG. 4, the blank 35 includes a leading portion 35A, a trailing portion 35B and an intermediate portion 35C therebetween. As noted in FIG. 4, one end of the blank 35 is provided with a tongue 35D which is adapted to mate with notch 35E when the blank is rolled into its final form, as best noted in FIG. 1. Blanked out or die cut out of the planar intermediate portion 35C of the blank 35 are one or more holding tangs 35F which are arranged to be cantileverly bent outwardly and having the free end thereof arranged to engage or snap into a corresponding tang opening 31 in the assembled position thereof, as noted in FIGS. 2 and 3.

The leading end portion 35A of the blank 35 is provided or shaped to form a series of gripping tangs or teeth 35G. The trailing end portion 35B is provided with a series of spaced apart tube support tangs 35H, the respective free ends of the tube support tangs 35H being arcuately shaped so that in the final assembled form, the tube support tangs 35H define the inlet opening to the inlet end portion A.

To form the blank 35 into its final form, the leading end portion 35A is inwardly bent along foldline $F_1$ and the trailing end portion 35B is inwardly folded or bent along foldline $F_2$, and the blank rolled to form its final circular configuration as shown in FIG. 4A. In forming the locking device 34, the gripping tangs or teeth 35G are inwardly and obliquely offset in the direction of the outlet end portion B of the connector body 22. The outer diameter of the locking device 34 is sized so that the locking device 34 can be snugly received within the outer chamber 25 of the inlet end portion A as noted in FIGS. 2 and 3.

If it is desirable to render the connector rainproof, a resilient sealing washer 37 may be interposed in the intermediate chamber 27. As best seen in FIGS. 2 and 3, the resilient sealing washer 37 is generally in the form of a truncated triangle in cross section wherein the outer periphery of the sealing washer defines the base portion of the general triangular cross section, having a width substantially equal to the width of the intermediate chamber 27. The short side of the triangularly shaped cross section of the sealing washer 37 is disposed at approximately a 90° angle to the base outer periphery and the hypotenuse of the triangular cross section is disposed at an angle generally complementing or at a slight angle relative to the oblique angle of the gripping teeth or tangs 35G in the relaxed state as best seen in FIG. 2. The outer diameter of the sealing washer is sized so as to be snugly received within the intermediate chamber 27. The inner diameter of the washer 37 is slightly less than the outer diameter of the tube 21, adapted to be fitted to the described connector so that when the end of the tube 21 is inserted into the inlet portion A and through the locking device and associated sealing washer 37, the apex portion of the sealing washer will compress so as to impart a sealing contact pressure on the tube 21 so as to effectively prohibit any moisture or rain water to pass by the sealing washer 37 and toward the outlet end portion B extending into an electric box or panel. A suitable sealing washer material may be neoprene, nitrile or other suitable resilient like material. It will be understood that the connector body 22 may be suitably molded or cast out of zinc, steel or other suitable metal or alloy.

In assembly, the resilient sealing washer 37 is positioned in the intermediate chamber 27 of the inlet end portion A so that the short side of the resilient sealing washer 37 is in abutment with shoulder 28. The locking device 34 is inserted into the outer chamber 25 of the inlet end portion oriented so that the holding tangs 35P are in line with the tang openings 31. The arrangement is such that the split locking device may be compressed so as to close the gap between the opposed ends thereof so that the locking device 34 may be readily inserted or press-fitted into the outer chamber 25 until the leading edge abuts up against shoulder 26. Upon insertion of the locking device into chamber 25, the holding tangs 35F will initially be forced inwardly toward the intermediate planar surface 35C and then will inherently spring outwardly as the holding tangs 35F are brought into alignment with its corresponding tang opening 31 so as to secure the locking device 34 within chamber 25. With the locking device secured within chamber 25, the gripping tang will be obliquely directed toward the hypotenuse of the sealing washer 37 in a relaxed state so as to define a slight angle therebetween, as noted in FIG. 2.

With the sealing washer 37 and locking device 34 so disposed and retained within the inlet end portion A of the connector body 22, one need only to push an electric metal tube 21, shown in phantom in FIGS. 2 and 3, pass the gripping tangs 35G of the locking device 34 and the sealing washer until the end of the tube 21 engages the stop shoulder 30. As the tube 21 is pushed through the ring of locking tangs, the tangs are slightly displaced to close the slight angle normally disposed between the hypotenuse of the sealing washer and gripping tangs (as best seen in phantom in FIG. 3). As a result, the gripping tangs effect an inherent gripping force on the tube so as to resist any opposing or pulling force that may be applied onto the tube in an effort to effect separation of the tube from the connector body 22. With the tube 21 so connected, the arrangement is such that the tube 21 is also firmly supported both at its inner end by the snug fitting relationship with support chamber 29 and by the support tangs 35H of the locking device 34 which are spaced apart from the support chamber. Accordingly, the two point support for the tube serve to resist any unwanted bending stresses to which the tube may be subjected.

To attach the connector body to an electric box or panel, the threaded outlet end portion B is sized so as to be readily insertable through any standard knockout opening. The connector body is secured to the electric box or panel by the lock nut 33 in the usual manner. If desired, a resilient sealing washer 36 may be interposed between the lock nut 33 and the wall of an electric box or panel P to prohibit any moisture or rain from entering through the knockout hole. It will be understood that the outlet end portion B may be formed or fitted with snap fit retaining ring as hereinbefore noted, by which the connector body may be secured to an electric box or panel.

Figure 5:
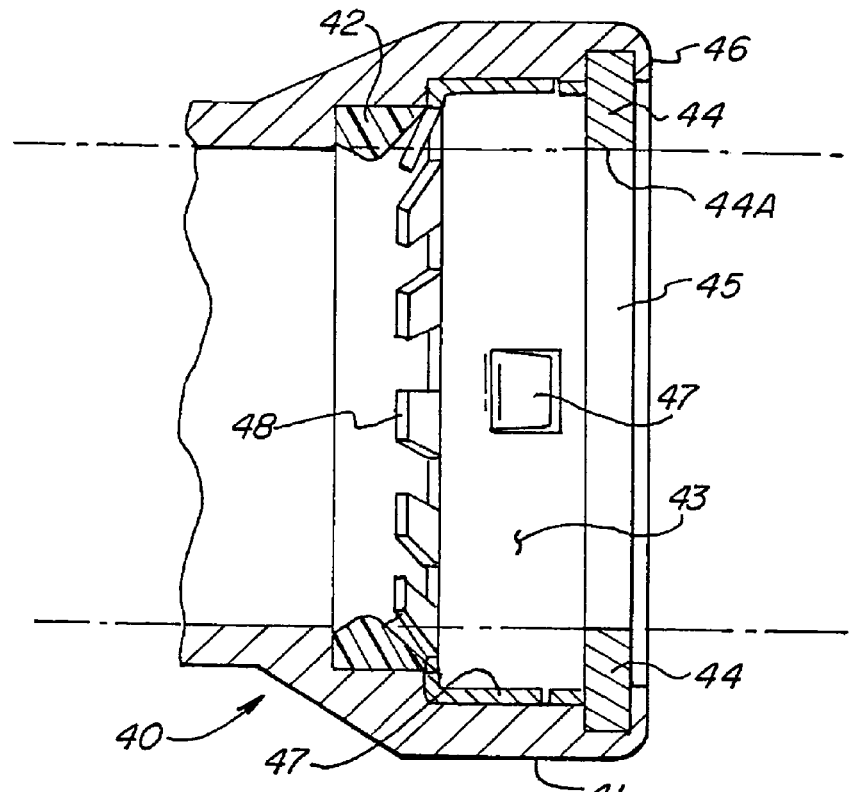
FIG. 5 is a fragmentary sectional view of a modified form of the invention.

FIG. 5 illustrates a slightly modified embodiment of the invention. In this form of the invention, the connector 40 includes a connector body 41 similar to that hereinbefore described. The embodiment of FIG. 5 differs from the embodiment of FIGS. 1 to 4 in that the outer chamber is devoid of any tang openings 31 as previously described. Also, the locking device 43 differs from the locking device 34 as described and shown in FIGS. 4 and 4A. The locking device 43 is similar to that illustrated in FIG. 9A, as will be hereinafter described. Essentially, the locking device 43 of the embodiment of FIG. 5 is devoid of the tube support tangs 35H, previously described. In lieu thereof, a backup washer 44 having a central opening 44A sized to snugly receive the electric metal tube 21 functions as a tube support. Disposed within the intermediate chamber is the resilient sealing washer 42 which is similar to that previously described. To retain the backup washer 44, the locking device 43 and the resilient sealing washer 42 in their respective position, the connector body is provided with an inturned lip 46 which is radially and inwardly bent or swedged or deformed to secure the respective components permanently in place. In this form of the invention, the tangs 47 formed about the intermediate planar portion of the locking device are maintained in the compressed state when the locking device 43 is disposed with its outer chamber. Due to the inherent resiliency of the tangs 47 and the tendency of tangs 47 to assume its outwardly bent relaxed state, a positive electric grounding effect is assured. In this form of the invention, the sealing washer 42, the locking device 43 and the backup washer 44 are permanently secured within the connector body. To attach a metal tube 21 to the connector body, one need only to push an end portion of a tube 21 through the inlet opening 44A of the washer 44 and pass the gripping tangs 48 of the locking device 43.

Figure 6:
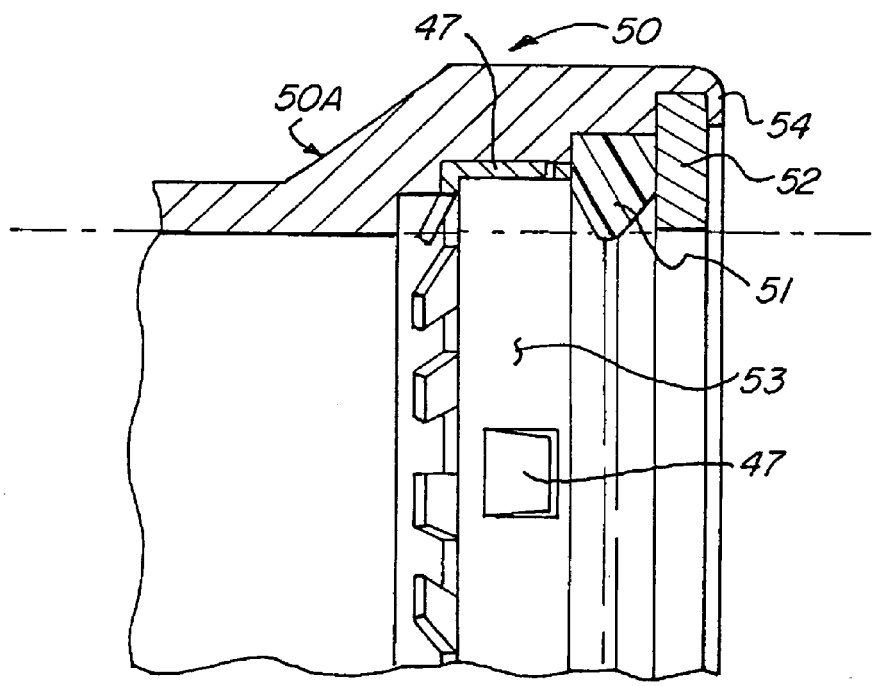
FIG. 6 is a fragmentary sectional view of another modified form of the invention.

FIG. 6 illustrates another slightly modified embodiment of the invention. In this embodiment, the connector body 50 has been modified to the extent that the inlet end portion 50A has been slightly modified to accommodate the resilient sealing washer 51 between the backup washer 52 and the locking device 53. Like in FIG. 5, the connector body 50 adjacent the inlet opening is provided with a radially inwardly formed lip or flange 54 which functions to lock the locking device 53 and the resilient sealing washer 51 in place within the inlet end portion 50A. As hereinbefore described to secure a tube 21 to the connector body 50, one need only insert the end portion of a tube 21 into the inlet end portion 50A until the end of the tube engages the innermost stop, as hereinbefore described. In all other respects, the structure and function is similar to that hereinbefore described.

FIGS. 7 to 9 illustrate a further embodiment of the invention. In this form of the invention, the connector 60 includes a connector body 61 similar to that hereinbefore described with respect to FIG. 1, except that the inlet end portion 60A is provided with an externally threaded portion 62 circumscribing the inlet opening 63. Essentially, the inlet end portion 60A has an outer chamber 64 and intermediate chamber 65 and tube receiving chamber 66 as previously described.

In this form of the invention, the locking device 67 is also slightly modified. Referring to FIG. 9, the locking device 67 is formed out of an elongated blank 68 of suitable spring steel metal having opposed end portions, one end having a projecting tongue 68A and a notch 68B formed in the other end of the blank. The blank also has a leading edge portion 68C, a trailing edge 68D and a planar intermediate portion 68E therebetween. The blank 68 also includes a series of tangs 69 that are die cut or blanked out of the plane of the intermediate portion 68E, the free end of tangs 69 being outwardly bent relative to the plane of the intermediate portion from which the tangs 69 are formed. To form the locking device 67, the blank 68 so formed is rolled into a circular ring wherein the projecting tongue 68A is fitted into notch 68B of the other end. The leading edge portion of the blank 68 is rolled or progressively bent radially inwardly along foldline $F_3$ to form a substantially 90° angle at the corner thereof as best seen in FIG. 8. As hereinbefore described, a series of gripping teeth or tangs 70 along the leading edge of the locking device 67 are normally obliquely bent outward toward the tube holding chamber 66. Securing the locking device 67 and the sealing ring 71 within the inlet end portion 60A of the connector body 61 is a back nut 72, which is provided with internal threading 72A by which it can be threaded onto the external threads 62 on the end of the connector body 61. The back nut 72 is provided with a center opening 72B having a diameter sized to accommodate a tube 21 associated therewith. To lock and secure a tube 21 to the connector 60, one simply needs to push the tube 21 through the back nut opening 72B, the locking device 67, the resilient sealing washer 71 and into the tube chamber 66 until the end of the tube abuts against the stop shoulder 66A.

In this form of the invention, it is to be noted that in positioning the locking device 67 into the inlet chamber portion 64, the arrangement is such that the tangs 69 of the locking device 67 are compressed inwardly so that when the locking device is fully seated within chamber 64, the inherent resiliency of the tangs 69 tend to exert an outwardly biasing force against the inner surface of chamber 64. The inherent biasing force imparted by the tangs 69 onto the internal surface of the chamber 64 ensures that the tangs 69 are maintained in positive contact with the internal surface of the connector body 61 to provide a positive electrical grounding effect.

In all other respects, connector 60 is structurally and functionally similar to the embodiment described with respect to the embodiment of FIGS. 1 to 4.

FIGS. 10 and 11 are directed to another modified form of the invention. This embodiment is directed to a connector 80 which is similar to the connector 60 as shown in FIGS. 7 to 9, except that the connector body 81 is provided with internal threads 82 circumscribing the inlet opening 83 to the outer chamber 84. The locking device 85 and the resilient sealing washer 86 are similar to those described with respect to FIGS. 7 to 9. In the embodiment of FIGS. 10 and 11, the locking device 85 and sealing washer 86 are secured within the inlet end portion of the connector body 81 by a back nut 87 having a short externally threaded stem 87A and a radially outwardly extending flange 87B whereby the internal thread stem 87A engages the inlet threads 82 of the connector body 81. In all other respects, the connector 80 is similar to connector 60 of FIGS. 7 to 9.

FIGS. 12 to 13 illustrate a further application of the invention described herein. As shown, the embodiment of FIGS. 12 and 13 is directed to a connector in the form of a coupler 90 for connecting at least two electrical metal tubes together. Coupler 90 includes a metal casting formed of a suitable metal or alloy as hereinbefore noted, which has an integral cylindrical center portion 91 terminating in opposed outwardly flaring end portions 91A, 91B. In the illustrated embodiment, the respective end portions 91A, 91B are identical mirror images of the other. However, it will be understood that the end portion need not be of the same size and that the dimensions thereof may be varied to accommodate varying size tubes 21.

In the illustrated embodiment of FIGS. 12 and 13, each end portion 91A, 91B are formed with an outer chamber 92A, 92B, an intermediate chamber 93A, 93B, and a tube support chamber 94A, 94B similar to that described with respect to the embodiment of FIGS. 1 to 4. Intermediate the cylindrical portion 91 of the coupler, there is provided an internal rib or flange 95 which functions as a stop for the tube end. Circumferentially spaced about the respective end portions 91A, 92B are one or more holes or apertures 96.

The locking devices 97A, 97B and resilient sealing washers 98A, 98B are similar in structure and function as hereinbefore described with respect to FIGS. 1 to 4, and need not be repeated.

In this form of the invention, the resilient sealing washers 98A, 98B and locking devices 97A, 97B are positioned and secured within their respective chambers similar to that described in FIGS. 1 to 4. Thus, all of the features and advantages noted with respect to the embodiment of FIGS. 1 to 4 are also achieved when employed in a coupler type fitting of FIGS. 12 and 13.

Figure 14:
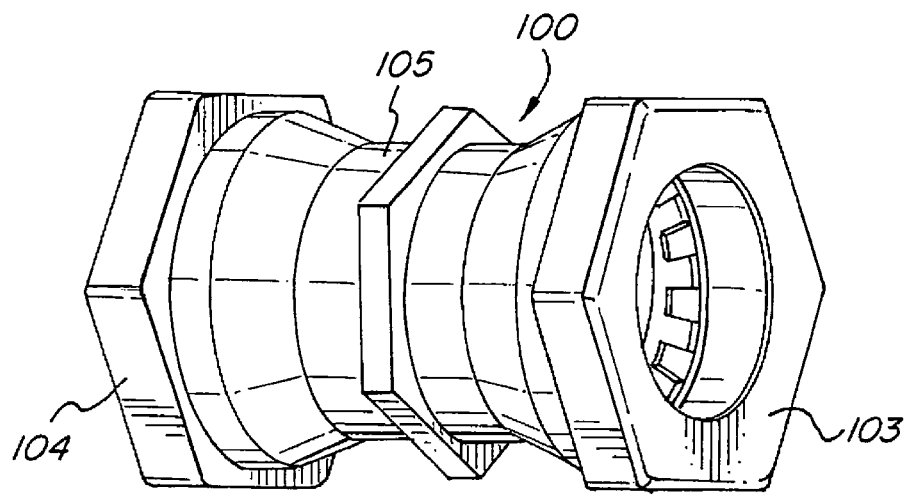
FIG. 14 is a perspective view of still another form of the invention.
Figure 15:
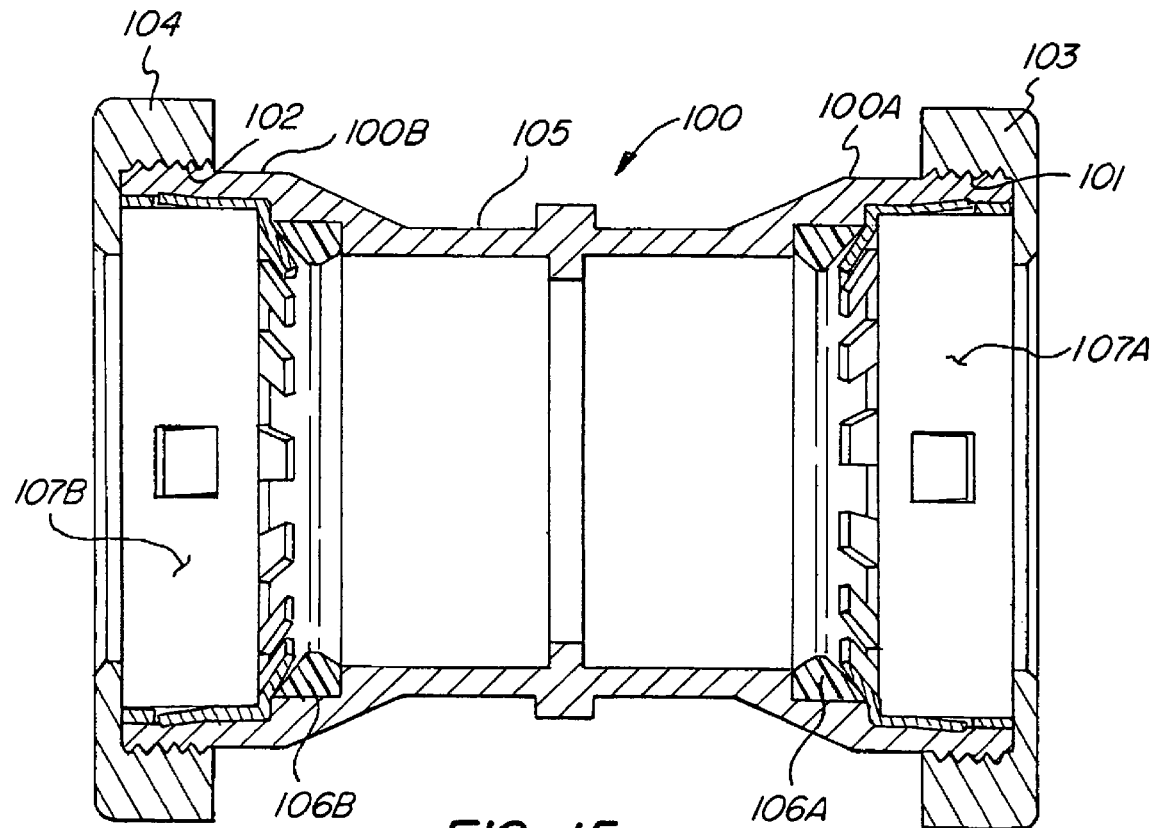
FIG. 15 is a sectional side view of the embodiment of FIG. 14.

FIGS. 14 and 15 are directed to another embodiment of the invention. In this form, the invention is directed to a modified coupler 100 which is similar in virtually all respects to that described with respect to FIGS. 12 and 13, except that the opposed enlarged inlet end portions 100A, 100B are provided with external threads 101 and 102 respectively for receiving a backup nut 103, 104, similar to that hereinbefore described. Also, in this form of the invention, the coupling body 105 does not require any tang openings 96, as described with respect to the embodiment of FIGS. 12 and 13.

The resilient sealing ring 106A, 106B and locking device 107A, 107B are similar to the respective sealing ring and locking device as described with respect to the embodiment of FIGS. 7 and 8. In all other respects, the embodiment of FIGS. 13 and 14 are structurally and functionally similar to that disclosed and described with respect to the embodiment of FIGS. 7 to 9.

From the foregoing disclosure, it will be apparent that the push-on type of connectors herein are described as being primarily useful for connecting an electrical metal tube (EMT). However, the described fittings may also be utilized as a connector for non electric tubes, e.g. plastic tubes and the like. As described herein, the novelty resides primarily in the resilient sealing washer having a generally truncated triangular cross sectional shape and a locking device which is rendered reusable, and which is formed to positively provide a unidirectional gripping force on the associated tube or conduit, and in one form a support for the associated tube to resist any bending forces imparted on the tube at the point of connection, and to provide an electrical bonding path when used with metallic tubing.

As in certain of the described embodiments, the locking device is provided with holding tangs co-operationally associated with corresponding tang openings formed in the inlet end portion of the connector body for positively securing the locking device within the inlet end portion, whereby the use of a backup nut may be eliminated to further simplify the structure of the described embodiments. In addition to the holding tang of the locking device, in one form of the invention described herein may also function as a very positive electrical grounding means.

In their respective entirety, the connector embodiments described herein greatly simplify the manufacturing and assembly of such connectors, reduces the costs thereof, and provides an arrangement whereby a tube or conduit associated therewith can be simply attached thereto by merely pushing one end of the conduit or tube through the inlet opening and through the unidirectional locking device that will resist any opposing force or pulling force which may be imparted on the tube to prohibit any separation. The described embodiments utilizing a backup nut, achieve a further advantage in that simple removal of the backup nut provides a means for readily removing the tube or conduit in the event disassembly is required without effecting or imparting any damage to the component parts, thereby rendering the components reusable.

While the present invention has been described with respect to several embodiments, it will be understood that various modifications may be made without departing from the spirit or scope of the invention.

What is claimed is:

1. An electrical push-in fitting for removably connecting an electrical metal tube comprising:
    a fitting body having an inlet end portion, an outlet end portion and a bore extending therethrough,
    an externally threaded portion placed on said fitting body adjacent the inlet end portion,
    said inlet end portion including a first chamber of a predetermined diameter,
    a second chamber adjacent said first chamber having a diameter which is smaller than said predetermined diameter of said first chamber, and
    a third chamber adjacent said second chamber having a diameter sized to snugly receive an end portion of an associated electrical metal tube to be connected to said body,
    a resilient sealing washer disposed in said second chamber,
    a unidirectional locking device disposed within said first chamber,
    said locking device being in the form of a circular split ring formed of spring steel having a leading edge, and a connected intermediate planar portion with a trailing edge, the circular split ring having a projecting tongue on one end and a complementary notch on the other end,
    said leading edge including a foldline forming a substantially ninety degree angle at the leading edge resulting in a radially inwardly bent portion relative to said intermediate planar portion,
    said radially inwardly bent portion of said leading edge having a plurality of gripping tangs immediately adjacent thereto and circumferentially spaced about said spilt ring,
    said gripping tangs being obliquely offset in the direction of the outlet end portion of said body and extending completely into said second chamber and away from the first chamber, wherein the connecting intermediate planar portion is held in the first chamber against an inner surface of the first chamber and said plurality of gripping tangs extend completely into said second chamber and the radially inwardly bent portion abuts a shoulder between the first chamber and said second chamber,
    said gripping tangs imparting a unidirectional gripping force on an end portion of a tube that is adapted to be pushed through said inlet end portion to secure a tube thereto, said gripping tangs resisting any opposing force tending to separate the tube from said body,
    a backnut placed on said externally threaded portion on said fitting body, said backnut contacting the trailing edge of said locking device, wherein the intermediate planar portion transmits a force from the trailing edge to the radially inwardly bent portion adjacent the shoulder between the first chamber and said second chamber, and
    a center opening formed in said backnut, said center opening sized for receiving and supporting the electrical metal tube,
    whereby a push-in unidirectional locking arrangement for securing an electric metal tube is formed so that the electric metal tube can be rendered readily removable.

2. An electrical fitting as defined in claim 1 wherein:
    said resilient sealing washer has a generally truncated triangular cross section whereby the hypotenuse of said sealing washer is disposed adjacent said gripper tangs.

3. An electric fitting as defined in claim 1 wherein said resilient sealing washer has an interior diameter which is slightly smaller than the exterior diameter of an electrical metal tube adapted to be fitted thereto.

4. An electrical fitting as defined in claim 1 and including means for securing said outlet end portion of said body to a knockout hole of an electric panel or enclosure.

5. An electrical push-in fitting for removably connecting en electrical metal tube as in claim 1 further comprising:
    a plurality of grounding tangs formed in the connected intermediate planar portion.

6. A push-in fitting for removably connecting an electrical metal tube thereto comprising:
    a fitting body having an inlet end portion, an outlet end portion and a bore extending therethrough,
    an externally threaded portion placed on said fitting body adjacent the inlet end portion,
    said inlet end portion having a plurality of chambers formed therein,
    each of said chambers having progressively decreasing diameters wherein the outermost chamber has the greater diameter and the innermost chamber having the smallest diameter, and an intermediate chamber therebetween,
    said smallest diameter chamber being sized to snugly receive an end portion of an electrical metal tube adapted to be secured to said body,
    a resilient sealing washer having an outer diameter substantially equal to the interior diameter of said intermediate chamber and an inner diameter slightly less than the outer diameter of an electrical metal tube adapted to be fitted to said body,
    a unidirectional locking device disposed in said outermost chamber, said unidirectional locking device forming a circular split ring having a projecting tongue on one end and a complementary notch on the other end,
    said locking device including a circular planar portion having a leading edge and a trailing edge,
    said leading edge being inwardly and radially bent at a foldline forming a substantially ninety degree angle relative to said circular planar portion,
    said inwardly and radially bent leading edge including a series of circumferentially spaced gripping tangs immediately adjacent thereto that are obliquely displaced in the direction toward said adjacent smaller chamber, and extending completely into the intermediate chamber and away from the outermost chamber, wherein the circular planar portion is held against an inner circumferential surface in the outermost chamber and the series of circumferentially spaced gripping tangs extend completely into the intermediate chamber and the leading edge abuts a shoulder between the outermost chamber and the intermediate chamber,
    a backnut placed on said externally threaded portion on said fitting body, said backnut contacting the trailing edge of said locking device, wherein the circular planar portion transmits a force from the trailing edge to the inwardly and radially bent leading edge adjacent the shoulder between the outermost chamber and the intermediate chamber, and
    a center opening formed in said backnut, said center opening sized for receiving and supporting the electrical metal tube, whereby a push-in unidirectional locking arrangement for securing an electric metal tube is formed so that the electric metal tube can be rendered readily removable.

7. An electrical push-in fitting in the form of a coupling for removably joining a pair of electrical metal tubes together comprising:

a coupling body having opposed enlarged end portions, each of said opposed end portions including an outer chamber defining an inlet opening for receiving an electric metal tube, each of said opposed end portions having an externally threaded portion, each of said outer chambers at their respective inner end being defined by an inner radial shoulder, an inner chamber disposed adjacent to each of said respective outer chambers, each of said inner chambers having a diameter which is smaller than the diameter of each of said adjacent outer chambers, the inner end of said inner chamber being defined by an inner radial shoulder, and a tube receiving chamber adjacent to each of said inner chambers for receiving an inner end portion of an electric metal tube sized to be snugly received therein, a split locking ring disposed in each of said respective outer chambers, said locking rings having projecting tongue on one end and a complementary notch on the other end, each of said respective split locking rings including a leading edge, a trailing edge and an intermediate planar portion therebetween, said leading edge being radially and inwardly bent along a foldline forming a substantially ninety degree angle relative to said intermediate planar portion, each of said leading edges including a plurality of circumferentially spaced apart gripping tangs having free ends angularly offset in the direction of said intermediate chamber adjacent thereto, and extending completely into the corresponding inner chamber and away from the corresponding outer chamber, wherein the intermediate planar portion is held against an inner circumferential surface in the corresponding outer chamber and the plurality of circumferentially spaced apart gripping tangs extend completely into the corresponding inner chamber and the leading edge abuts the inner radial shoulder between the corresponding outer chamber and the corresponding inner chamber, and an annular sealing washer disposed in each of said intermediate inner chambers, each of said annular sealing washers having a generally truncated triangular cross-section defining an inner diameter which is slightly smaller than the outer diameter of an electric metal tube sized to be fitted into said inner tube receiving chamber adjacent thereto, a backnut placed on each of said externally threaded portions on said coupling body, each said backnut contacting the trailing edge of each of said split locking rings, wherein the intermediate planar portion transmits a force from the trailing edge to the radially and inwardly bent leading edge adjacent the inner radial shoulder between the corresponding outer chamber and the corresponding inner chamber, and a center opening formed in each said backnut, said center opening sized for receiving and supporting each of the electrical metal tubes, whereby a push-in unidirectional locking arrangement for securing an electric metal tube in each end of a coupling is formed so that the each of the electric metal tubes can be rendered readily removable.

8. An electrical push-in fitting for removably connecting an electrical metal tube comprising:

a fitting body having an inlet end portion, an outlet end portion and a bore extending therethrough forming an outer chamber, an intermediate chamber, and a tube receiving chamber, the tube receiving chamber sized to receive an electrical metal tube;

an externally threaded portion placed on said fitting body adjacent the inlet end portion, a shoulder formed between the outer chamber and the intermediate chamber;

a sealing washer placed within the intermediate chamber;

a unidirectional locking device placed within the outer chamber, said unidirectional locking device comprising a circular split ring formed of spring steel having a projecting tongue on one end and a complementary notch on the other end and having a leading edge, and a connected intermediate planar portion, the leading edge including a foldline forming a substantially ninety degree angle at the leading edge resulting in a radially inwardly bent portion relative to the intermediate planar portion, the radially inwardly bent portion of the leading edge having a plurality of gripping tangs circumferentially spaced about the leading edge of the circular split ring, the plurality of gripping tangs being obliquely offset in the direction of the tube receiving chamber of said fitting body and extending completely into the intermediate chamber and away from the outer chamber, wherein the connecting intermediate planar portion is held against an inner circumferential surface in the outer chamber and the plurality of gripping tangs extend completely into the intermediate chamber and the radially inwardly bent portion abuts said shoulder formed between the outer chamber and the intermediate chamber, the plurality of gripping tangs imparting a unidirectional gripping force on an end portion of the electrical metal tube that is adapted to be pushed through the inlet end portion to secure the electrical metal tube to the electrical fitting;

a backnut placed on said externally threaded portion on said fitting body, said backnut contacting the trailing edge of said unidirectional locking device, wherein the intermediate planar portion transmits a force from the trailing edge to the radially inwardly bent portion adjacent said shoulder between the outer chamber and the intermediate chamber, and a center opening formed in said backnut, said center opening sized for receiving and supporting the electrical metal tube, whereby the electrical metal tube is securely held in said fitting body so as to be easily removable and a weathertight seal is formed.

* * * * *